United States Patent [19]
Elbling

[11] 3,887,857
[45] June 3, 1975

[54] MEASURING APPARATUS FOR MACHINE TOOL SYSTEMS
[75] Inventor: Joseph Elbling, Armonk, N.Y.
[73] Assignee: Inductosyn Corporation, Valhalla, N.Y.
[22] Filed: Nov. 19, 1973
[21] Appl. No.: 416,892

[52] U.S. Cl. ............... 318/572; 318/603; 318/660; 51/165.77
[51] Int. Cl. ......................................... G05b 19/24
[58] Field of Search ...... 318/572, 603, 660; 51/165, 51/165.77

[56] References Cited
UNITED STATES PATENTS

| | | | |
|---|---|---|---|
| 3,165,680 | 1/1965 | Morrison | 318/660 X |
| 3,531,800 | 9/1970 | Brescia | 318/603 X |
| 3,641,849 | 2/1972 | Kinney | 318/572 X |
| 3,673,585 | 6/1972 | Tripp et al. | 318/660 X |
| 3,691,357 | 9/1972 | McIntosh | 318/603 X |
| 3,700,993 | 10/1972 | Fischer | 318/603 |
| 3,727,493 | 4/1973 | Lahm | 318/572 X |
| 3,746,956 | 7/1973 | Takegawa | 318/572 |
| 3,748,562 | 7/1973 | Takegawa et al. | 318/572 |

*Primary Examiner*—T. E. Lynch
*Attorney, Agent, or Firm*—William E. Beatty; John L. Downing

[57] ABSTRACT

A workpiece registration unit provides dimension signals representative of the diameter of a cylindrical workpiece while a plunge cut therein is made by a grinding wheel of a grinding machine. The dimension signals are provided in response to a workpiece error signal generated by a gage having probes in contact with the workpiece. During the plunge cut, the dimension signals are utilized to control movement of a wheel slide of the grinding machine which is connected to the grinding wheel. The movement causes a responsive change in wheel slide signals provided by a wheel slide registration unit. After substantially completing the plunge cut, the wheel slide signals are altered to correspond to the dimension signals of the workpiece registration unit. The probes are retracted from the workpiece and a portion thereof having a keyway therein is plunge cut with the (previously) altered wheel slide signals being utilized to control the movement.

7 Claims, 3 Drawing Figures

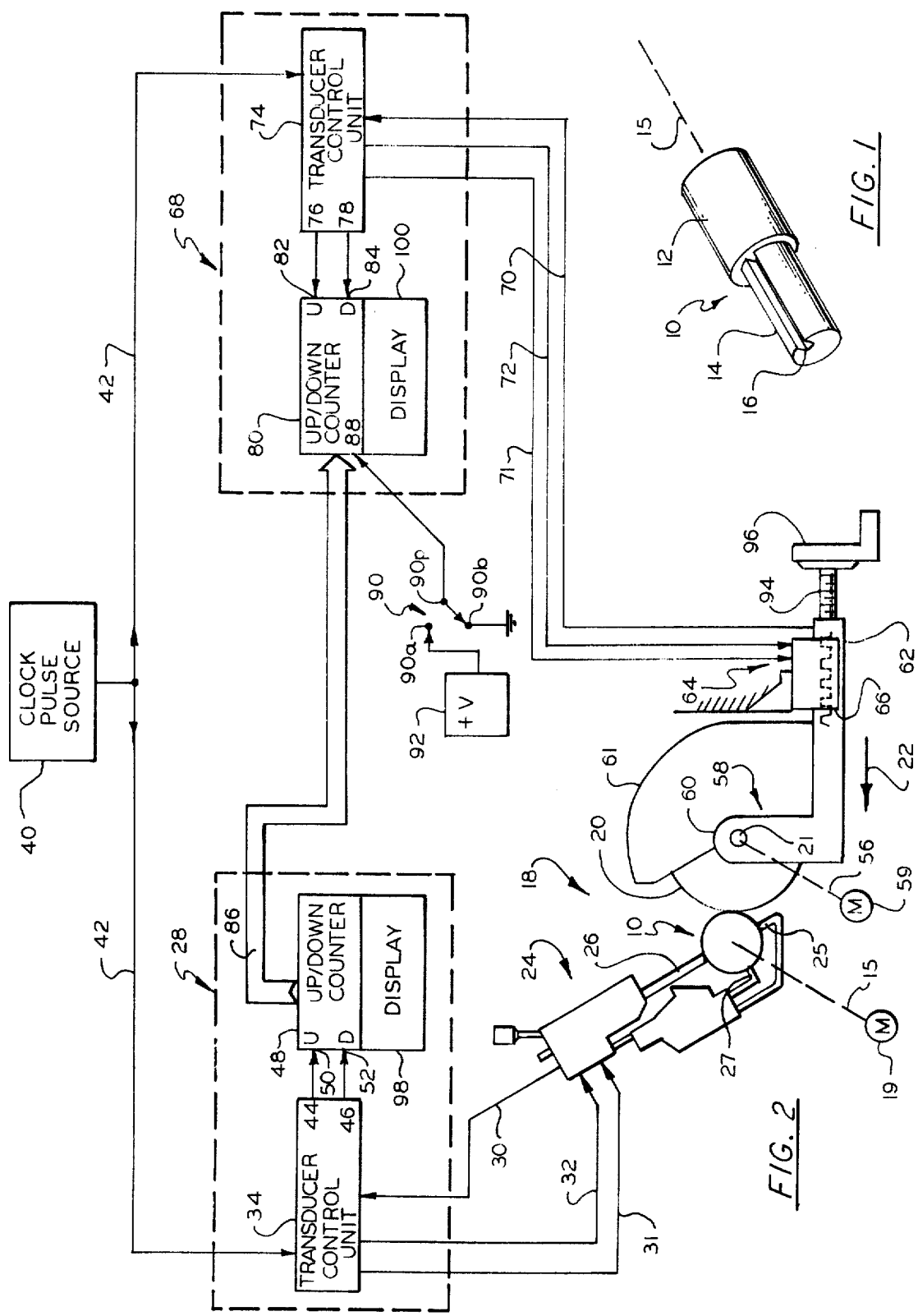

MEASURING APPARATUS FOR MACHINE TOOL SYSTEMS

BACKGROUND OF THE INVENTION

1. Field of the Invention

This invention relates to machine tool systems such as, boring mills, milling machines and dimension inspection machines, and more particularly to apparatus for providing a representation of a dimension of a workpiece which cannot be directly measured.

2. Description of the Prior Art

Ideally, during a machine cut, the position of a cutting tool of a machining apparatus is controlled by signals which are representative of a dimension of a workpiece which is changed by the cut.

When, for example, a grinding machine cuts a cylindrical workpiece having a continuous surface, the cut is typically controlled by a control apparatus which includes a gage having probes which are maintained in contact with the continuous surface.

In response to a signal provided by the gage, a workpiece registration unit generates dimension signals representative of the diameter of the workpiece. The dimension signals control the movement of a wheel slide of the machine which has mounted thereon an axially rotating grinding wheel. The movement causes the axis of the grinding wheel to move towards the axis of the workpiece whereby the grinding wheel makes a cut (known in the art as a plunge cut) into the workpiece.

In the control apparatus, the dimension signals are compared with a signal representation of a desired diameter of the workpiece. To compensate for compliance of the workpiece, the movement of the wheel slide is stopped in response to the diameter of the workpiece being slightly greater than the desired diameter, the difference between the desired diameter and the slightly greater diameter being referred to in the art as a sparkout distance. When the wheel slide is stopped, the compliance of the workpiece causes the continuous surface to bear against the grinding wheel whereby the workpiece is cut to the desired diameter.

Typically, the workpiece and the grinding wheel are cooled by a liquid coolant. The temperature of the coolant may vary slowly due to a variation of environmental humidity, thereby causing a change of the diameter of the workpiece. Additionally, it is well known in the art that a variation of environmental temperature may cause changes in both the diameter of the workpiece and the exact location of portions of the grinding machine. The exact location may also change due to the compliance of the grinding machine. Changes of the diameter of the workpiece and the exact location may be caused by a plethora of factors in addition to those referred to hereinbefore. However, the changes are of little importance because the dimension signals are representative of the diameter of the workpiece in contact with the probes.

The dimension signals cannot be provided when the diameter of the workpiece is not within the range of measurement of the gage or when the workpiece has an interrupted surface (typically caused by a spline or a keyway) which may snag or break the probes.

A portion of a workpiece having an interrupted surface, for example, is plunge cut by moving the axis of the grinding wheel towards the interrupted portion thereby providing a rough cut therein. Because of the changes referred to hereinbefore, a final cut to a desired diameter is typically performed by alternately moving the grinding wheel to make a small cut and stopping the grinding machine to measure the diameter of the interrupted portion with a micrometer. The plunge cut into the interrupted portion is complete when the desired diameter is measured.

For reasons given hereinbefore, apparatus for machine cutting has been slow, costly and inaccurate when a dimension being changed by a machine cut cannot be directly measured.

SUMMARY OF THE INVENTION

An object of the present invention is to measure a dimension of a workpiece.

Still another object of the present invention is to provide apparatus for accurately measuring a portion of a workpiece which cannot be directly measured by a gage.

According to the present invention, machine slide signals are changed in response to a change of the position of a movable element of a transducer which is indirectly connected to a workpiece; directly connected to said workpiece is a gage which provides gage signals representative of a dimension of said workpiece; at a selected time said machine slide signals are altered to correspond to said gage signals.

The invention may be utilized for economically, and rapidly machine cutting workpieces having continuous and interrupted surfaces. A workpiece is cut to a desired dimension in response to a signal representation of a dimension of the workpiece which is changed by the cut. The signal representation is typically provided in response to a signal provided by an Inductosyn transducer.

Other objects, features and advantages of the present invention will become more apparent in the light of the following detailed description of embodiments thereof, as illustrated in the accompanying drawing.

BRIEF DESCRIPTION OF THE DRAWING

FIG. 1 is a perspective view of a workpiece;

FIG. 2 is a schematic block diagram of a first embodiment of the present invention.

DESCRIPTION OF A PREFERRED EMBODIMENT

Figure 3:
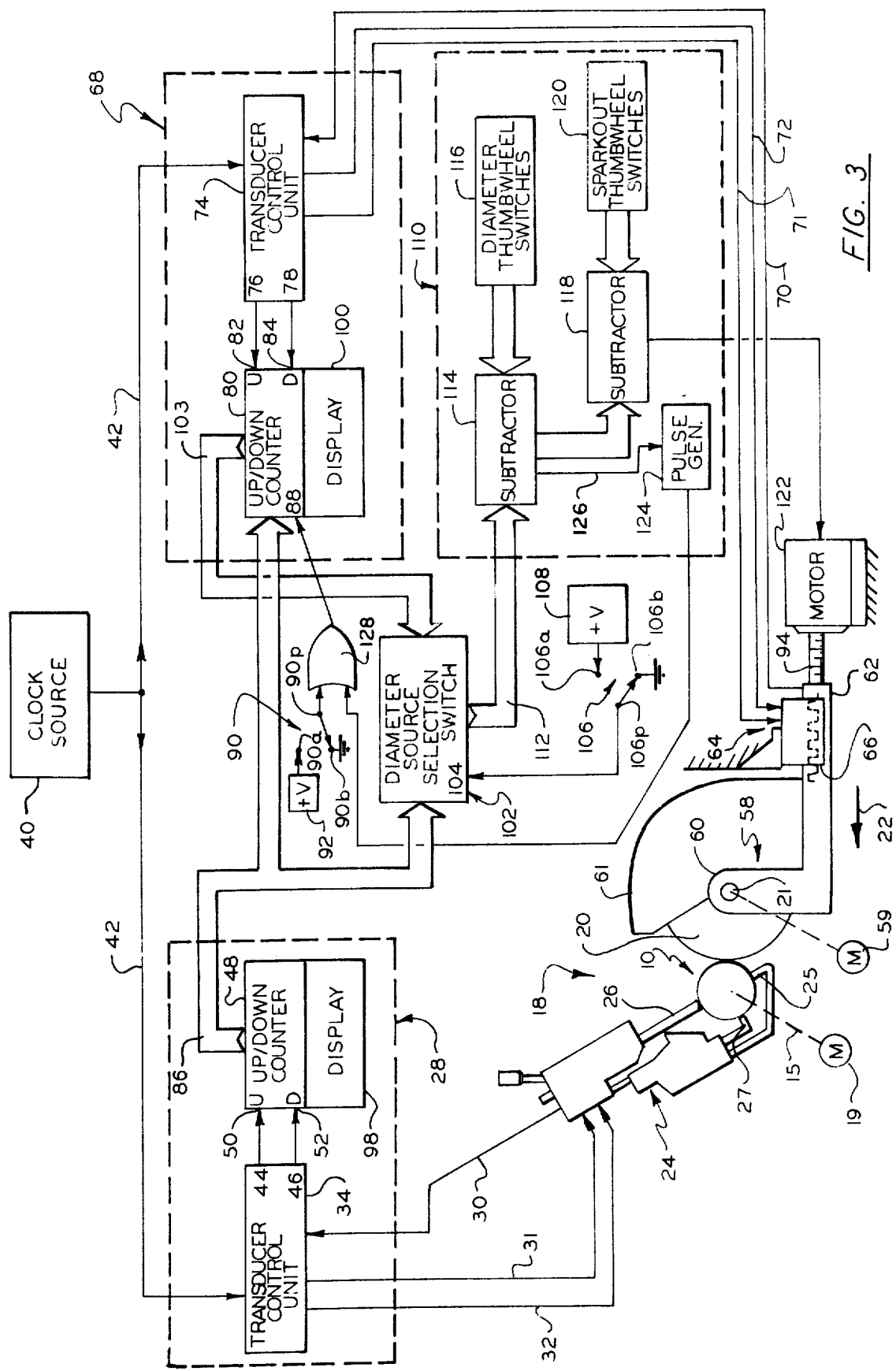
FIG. 3 is a schematic block diagram of a second embodiment of the present invention.

Referring now to FIGS. 1 and 2, the teachings of the present invention are exemplified by describing the grinding of a cylindrical workpiece 10 which is comprised of a portion 12 having a continuous surface and a portion 14 having a surface with a keyway 16 therein.

In a first embodiment, a grinding wheel of a grinding machine is moved to a position to plunge cut the portion 12 (referred to as a first plunge cut) while the workpiece 10 is rotated about the axis 15 thereof. During the first plunge cut, the portion 12 is in slidable contact with stationary probes of a gage which is connected to a workpiece registration unit 28. In response to an actual displacement between the probes, a signal generated by the output of the gage is provided to the workpiece registration unit 28. The signal from the gage causes the workpiece registration unit 28 to provide dimension signals on lines 86 representative of the diameter of the portion 12. After the first plunge cut, the grinding wheel is moved to a position to plunge cut the portion 14 (referred to as a second plunge cut).

During the second plunge cut the rotation of the workpiece 10 causes a corresponding rotation of the keyway 16. It should be understood that the probes cannot be in slidable contact with the portion 14 without becoming snagged within the keyway 16 whereby the workpiece registration unit 28 cannot provide dimension signals representative of the diameter of the portion 14.

According to the present invention, a wheel slide registration unit 68 provides wheel slide signals in counter 80 which change in response to a movement of a wheel slide connected to the grinding wheel. After substantial completion of the first plunge cut, the wheel slide signals are altered to conform to the dimension signals. The altered wheel slide signals provide a signal representation which may be utilized to control the second plunge cut. The altering of the wheel slide signals is referred to as validating.

Referring now to FIG. 2, the workpiece 10 is maintained for rotation about the axis 15 within a grinding machine 18. One end of the workpiece 10 is connected to a motor 19 whereby rotation of the shaft of the motor 19 causes the workpiece 10 to rotate.

During the first plunge cut, the portion 12 (FIG. 1) is maintained opposite the grinding face of a rotating grinding wheel 20 of the machine 18, the axis 21 of the wheel 20 being maintained parallel to the axis 15. The first plunge cut is provided in response to the wheel 20 being moved in a direction indicated by an arrow 22 whereby the axis 21 moves towards the axis 15.

Associated with the machine 18 is a gage 24 having retractable probes 25-27 which are all maintained in slidable contact with the portion 12 (FIG. 1). The probes 25, 26 contact the portion 12 at respective ends of a diameter thereof.

The gage 24 includes an Inductosyn transducer (not shown) which is connected to a workpiece registration unit 28 through signal lines 30-32. The transducer of the gage 24 generates an error signal (referred to as a workpiece error signal) through the line 30 and receives gage input signals through the lines 31, 32.

Within the registration unit 28, the workpiece error signal is received and gage input signals are provided by a transducer control unit 34 via the lines 31 and 32.

Associated with the gage and workpiece error signals is an AC reference voltage (not shown) which is generated within the control unit 34. As explained hereinafter, the phase of the workpiece error signal, with respect to the phase of the AC reference voltage, is indicative of whether an indicated displacement between the probes 25, 26 is greater or lesser than the actual displacement therebetween. The provision of a representation of the indicated displacement is described hereinafter.

In response to the indicated displacement being substantially equal to the actual displacement, the workpiece error signal is a null. When the indicated displacement is greater than the actual displacement, the workpiece error signal is in phase with the reference voltage. Correspondingly, when the indicated displacement is less than the actual displacement, the workpiece error signal is out of phase with the reference voltage. The gage 24 and the control unit 34 are disclosed by Raiteri in the U.S. Pat. No. 3,802,807 wherein a digital readout is similar to the registration unit 28. The Raiteri patent is hereby incorporated herein and made a part hereof.

The control unit 34 has a clock input connected to a clock pulse source 40 through a signal line 42. The clock source 40 periodically provides a pulse having an amplitude of approximately 3 volts (referred to as ONE hereinafter). In the absence of a clock pulse, the clock source 40 provides approximately 0 volts (referred to as ZERO hereinafter). As known to those skilled in the art, ONE and ZERO are collectively referred to as logic signals. In alternative embodiments logic signals may have associated therewith voltages of any desired amplitude.

In response to the workpiece error signal on line 30 being out of phase with the reference voltage (not shown), a clock pulse is provided by the clock source 40 through the control unit 34 at an output 44 thereof. In response to the workpiece error signal being in phase with the reference voltage, a clock pulse is provided through the control unit 34 at an output 46 thereof.

The outputs 44, 46 are connected to an up/down counter 48 at an up input (U) 50 and a down input (D) 52, respectively. The counter 48 provides at outputs thereof a plurality of logic signals collectively representative of the cumulative difference between the number of clock pulses provided to the inputs 50, 52, respectively. It should be understood that the cumulative difference is incremented (by one) in response to a pulse provided to the input (U) 50 and decremented (by one) in response to a pulse provided to the input (D) 52. Up/down counters, such as the counter 48, are well known to those skilled in the integrated semiconductor circuit art.

The control unit 34 includes an internal counter (not shown) which receives pulses corresponding to the clock pulses provided at the outputs 44, 46. The internal counter, similar to the counter 48, provides logic signals representative of the cumulative difference. In response to the logic signals provided by the internal counter, the control unit 34 provides the gage input signals on lines 31 and 32 referred to hereinbefore.

In accordance with the explanation of the control unit 34, the internal counter and the counter 48 are incremented (or decremented) until the workpiece error signal is a null (indicative of the indicated displacement between the gage probes 25 and 26 being substantially equal to the actual displacement between the probes). Therefore, the signals provided at the outputs of the counter 48 are representative of the indicated displacement (and referred to as dimension signals).

It should be understood that in response to a single pulse incrementing or decrementing the counter 48, the indicated displacement is changed by a small increment. Additionally, the clock pulse source 40 provides pulses at a rapid rate. Accordingly, a change of the actual displacement between the gage probes 25 and 26 causes the indicated displacement to rapidly change by small increments whereby the indicated displacement is substantially equal to the actual displacement.

In the machine 18, the wheel 20 has an axial hole therethrough which receives a shaft 56 which is affixed to the portion of the wheel 20 which forms the axial hole. Accordingly, the wheel 20 is carried by the shaft 56. A portion of the shaft 56 adjacent to the wheel 20 is journalled within bearings of a wheel slide 58 in an end region 60 thereof. Accordingly, the shaft 56 connects the wheel 20 to the wheel slide 58 whereby a movement of the wheel slide 58 causes a corresponding movement of the wheel 20.

One end of the shaft 56 is coaxially coupled to the output shaft of a motor 59 which rotates the wheel 20 in the direction of rotation of the workpiece 10. In this embodiment a shield 61 is mounted on the end region 60 to shield an operator of the machine 18 from particles which may be propelled from the workpiece 10 during a plunge cut.

It is well known that an extensive use of a grinding wheel causes a significant reduction in the diameter thereof. In this embodiment, the wheel 20 is selected to maintain a substantially constant diameter during a plunge cut. Because the diameter remains substantially constant during a plunge cut, a movement of the wheel slide 58 equals a change of a radius of the workpiece 10.

The wheel slide 58 has an end region 62 which is integral with a movable element of a wheel slide transducer 64. The wheel slide 58 is movable relative to a stationary element 66 of the transducer 64 (which is stationary relative to the axis 15). The transducer 64, which is similar to the transducer of the gage 24 referred to hereinbefore, is connected to a transducer control unit 74 of wheel slide registration unit 68 through signal lines 70–72.

In a manner similar to the operation of the gage 24, the transducer 64 provides an error signal (referred to as a wheel slide error signal) through the line 70 and receives transducer signals through the lines 71, 72.

Within the registration unit 68, the wheel slide error signal is received on line 70 and the transducer signals are provided by a transducer control unit (similar to the control unit 34) via the lines 71–72. It should be understood that when the wheel slide 58 is moved parallel to the axis 15, there is no relative movement between the element 66 and the movable element of the transducer 64 whereby the transducer signals are unchanged; the transducer signals change in response to movement of the wheel slide 58 in the direction of the arrow 22 and in the direction opposite therefrom.

Since a movement of the wheel 20 is caused by a movement of the wheel slide 58, during a plunge cut the transducer signals on lines 71–72 have amplitudes and phases which change in correspondence with a change of a diameter of the workpiece 10.

The control unit 74 has a clock input connected to the clock source 40 through the line 42. In response to a wheel slide error signal on line 70, a clock pulse may be provided through the control unit 74 either at an output 76 or an output 78 thereof. The outputs 76, 78 correspond to the outputs 44, 46, respectively, described hereinbefore.

The outputs 76, 78 are connected to an up/down counter 80 (similar to the counter 48) at an up input (U) 82 and a down input (D) 84, respectively.

In response to logic signals provided by an internal counter (not shown) of the control unit 74 (similar to the internal counter of the control unit 34), the control unit 74 provides the transducer signals on lines 71 and 72 referred to hereinbefore. In correspondence with the explanation of the dimension signals, the counter 80 provides logic signals (referred to as wheel slide signals) which are changed in response to a change of the position of the movable element of the transducer 64, the movable element being indirectly connected to the workpiece 10 (via the wheel slide 58 and the wheel 20).

The counter 80 has additionally connected thereto the outputs of the counter 48 through a plurality of signal lines 86 whereby the dimension signals are provided to the counter 80. In response to ONE being provided to a load input 88 of the counter 80, the contents of the counter 80 are altered to conform to the dimension signals (the registration unit 68 being thereby validated). The alteration of the contents of a counter in response to a signal provided to a load input thereof is well known in the art.

The load input 88 is connected to a manually operated switch 90 at a pole 90p thereof. The switch 90 has a contact 90a connected to a logic ONE voltage source 92 which provides approximately 3 volts; a contact 90b of the switch 90 is connected to ground. Accordingly, the switch 90 may be manipulated to provide either ONE or ZERO to the load input 88, whereby the switch 90 is operable to validate the registration unit 68.

To move the wheel slide 58, connected thereto is a proximal end of a lead screw 94. In response to a clockwise axial rotation of the lead screw 94, the wheel slide 58 moves in the direction indicated by the arrow 22; a counterclockwise axial rotation causes the wheel slide 58 to move opposite from the direction indicated by the arrow 22. The use of a lead screw to move a wheel slide is well known to those having a knowledge of grinding machines.

A distal end of the lead screw 94 shown in FIG. 2 is connected to a hand crank 96 which may be rotated to cause a corresponding rotation of the lead screw 94.

In FIGS. 2 and 3, the counters 48, 80 are respectively connected to numeric displays 98, 100 whereby the dimension and wheel slide signals are respectively provided thereto. The displays 98, 100 provide respective showings of illuminated numerals representative of the dimension and wheel slide signals.

During the first lunge plunge the hand crank 96 is rotated to cause the display 98 to provide a showing representative of a first desired diameter, e.g., the diameter of portion 12 of the workpiece 10 in FIG. 1.

In response to the display 98 providing a showing representative of the first desired diameter, the operator of the machine 18 manually manipulates the switch 90 to validate the registration unit 68. After the validation, the operator manipulates the switch 90 to cause the pole 90p to provide ZERO. When the pole 90p provides ZERO, the wheel slide 58 is moved to cause successive movement of the wheel 20 first in a direction opposite from the direction indicated by the arrow 22, then parallel to the axis 15 to a position opposite the portion 14, and then in the direction of the arrow 22 to cause the wheel 20 to contact the workpiece 10. Because the wheel slide signals change in response to the movement of the wheel slide 58 in the direction of the arrow 22 and the direction opposite therefrom, when the wheel 20 contacts the workpiece 10 the wheel slide signals are representative of the diameter of the portion of the workpiece being ground.

To provide the second plunge cut, the operator rotates the hand crank 96 to cause the transducer 64 to actuate registration unit 68 and the display 100 to provide a showing representative of a second desired diameter, i.e., the diameter of portion 14 of the workpiece 10.

Thus there is shown hereinbefore a manually controlled grinding machine for plunge cutting two portions of a cylindrical workpiece where the diameter of only one portion can be measured with a gage.

In a second embodiment of the present invention, during the first and second plunge cuts the movement of the wheel slide 58 is provided in response to the dimension signals and the wheel slide signals, respectively.

Referring now to FIG. 3, the counters 48, 80 are connected to a diameter source selection switch 102 through the lines 86, and a plurality of signal lines 103, respectively. A selection input 104 of the selection switch 102 is connected to a manually operated switch 106 (similar to the switch 90) at a pole 106p thereof. Contacts 106a, 106b of the switch 106 are respectively connected to a logic ONE voltage source 108 (similar to the source 92) and ground whereby the switch 106 may be manipulated to provide either ONE or ZERO to the selection switch 102.

In response to the switch 106 providing ZERO, the selection switch 102 provides the dimension signals from counter 48 at a plurality of output lines 112 thereof; the selection switch 102 provides the wheel slide signals from counter 80 on lines 112 when the switch 106 provides ONE. The selection switch 102 is of a type well known in the integrated semiconductor circuit art and is often referred to as a multiplexing switch.

The outputs of the selection switch 102 are connected to a wheel slide controller 110 through a plurality of signal lines 112. Within the controller 110, a subtractor 114 has a first group of inputs respectively connected to the lines 112. A second group of inputs of the subtractor 114 is connected to diameter thumbwheel switches 116.

The subtractor 114 provides at a plurality of outputs thereof difference signals representative of the difference between a diameter represented by signals on the line 112 and a diameter represented by signals provided by the thumbwheel switches 116. Subtractor circuits are well known in the integrated semiconductor circuit art.

The thumbwheel switches 116 are rotatable to provide a visual indication of numerals corresponding to a desired diameter. Concurrently with providing the visual indication, the thumbwheel switches 116 provide a signal representation of the desired diameter. Thumbwheel switches are well known to those skilled in the art.

Prior to making the first plunge cut, the operator manipulates the thumbwheel switches 116 to provide a visual indication of the first desired diameter, and then manipulates the switch 106 to cause the pole 106p to provide ZERO. Because of the manipulation of the switches 106, 116, during the first plunge cut the difference signals at the output of the subtractor 114 are substantially representative of the difference between the diameter of the workpiece 10 and the first desired diameter (referred to as a difference distance hereinafter).

The outputs of the subtractor 114 are connected to a subtractor 118 (similar to the subtractor 114) at a first group of inputs thereof. A second group of inputs of the subtractor 118 are connected to sparkout thumbwheel switches 120 (similar to the thumbwheel switches 116).

In this embodiment, the thumbwheel switches 120 are manipulated to provide a visual indication of the sparkout distance of the portion 12 whereby a signal representation of the sparkout distance is provided to the subtractor 118.

In response to the sparkout distance being smaller than the difference distance, the subtractor 118 provides ONE at a sign output thereof; when the difference distance equals the sparkout distance, the subtractor 118 provides ZERO.

The sign output of the subtractor 118 is connected to control a motor 122 which is fixedly mounted with respect to the axis 15. The motor 122 has a shaft integral with the distal end of the lead screw 94. In response to the subtractor 118 providing ONE, the motor 122 rotates the lead screw 94 whereby the wheel slide 58 moves in the direction of the arrow 22.

Hence, during the first plunge cut the wheel slide 58 is moved in the direction of the arrow 22 until the difference distance equals the sparkout distance.

A sign output of the subtractor 114 is connected to a pulse generator 124 at an input thereof through a signal line 126. The sign output of the subtractor 114 provides a logic signal representative of the sign of the difference distance; ZERO is provided when the difference distance is greater than zero; ONE is provided when the difference distance is less than or equal to zero. In response to ONE being provided at the sign output of the subtractor 114, the pulse generator 124 provides a pulse of approximately 3 volts. The pulse generator 124 may be comprised of a monostable multivibrator circuit or any other suitable circuit.

In this embodiment, the output of the pulse generator 124 and the pole 90p are connected to respective inputs of an OR gate 128.

As known to those skilled in the art, an OR gate is a circuit for providing ONE in response to ONE being provided to an input thereof.

The output of the OR gate 128 is connected to the input 88 whereby the registration unit 68 is validated either in response to a pulse provided by the pulse generator 124 or ONE being provided in response to a manipulation of the switch 90.

After the first plunge cut the operator manipulates the switch 106 to cause the pole 106p to provide ONE whereby the wheel slide signals are provided to the subtractor 114. Additionally, the operator manipulates the thumbwheel switches 116, 120 to provide therefrom respective representations of the second desired diameter and the sparkout distance of the portion 14. After the manipulation of the switches 106, 116, 120, the operator positions the wheel 20 to make the second plunge cut in a manner similar to that described hereinbefore.

Thus there is shown hereinbefore a grinding machine controlled by a controller for plunge cutting two portions of a cylindrical workpiece where the diameter of only one portion can be measured with a gage.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In the method of providing a signal representation of an unknown dimension of a portion of a workpiece unsuited for direct gage measurement mounted within a machine tool, the steps of:
  generating dimension signals representative of a gaged dimension of said workpiece in response to a signal provided by a gage which senses said gaged dimension;
  generating machine slide signals which change in response to a movement of a machine slide of said machine tool;
  altering said machine slide signals to conform to said dimension signals when said machine slide is connected to a portion of said workpiece having said gaged dimension; and
  positioning said machine slide for connection with said portion of said workpiece having said unknown dimension.

2. In the method of claim 1 where the step of generating machine slide signals includes the steps of:
  providing a difference signal representative of the difference between a dimension represented by said machine slide signals and a desired dimension; and
  controlling the movement of said machine slide in response to said difference signal.

3. In apparatus for providing a representation of a first dimension of a workpiece mounted within a machine tool, said first dimension being unsuited for direct gage measurement, which includes a machine slide which is movable with respect to said workpiece, a workpiece registration unit providing dimension signals which are generated in response to a signal provided by a gage having members disposed to sense a second dimension of said workpiece, the improvement comprising:
  control means for moving a machine slide of said machine tool relative to said workpiece;
  transducer means connected to said machine slide for generating machine slide signals which change in response to a movement of said machine slide; and
  means for altering said machine slide signals to conform to said dimension signals.

4. Apparatus according to claim 3 wherein said control means comprises means for moving said machine slide in response to said machine slide signals.

5. Measuring apparatus for indicating a dimension of a portion of a workpiece unsuited for direct gage measurement, the apparatus being connected to a machine tool adapted for receiving said workpiece therein, said machine tool having a machine slide which is movable with respect to said workpiece, comprising:
  workpiece registration means, including gaging means for providing dimension signals representative of a dimension of another portion of said workpiece;
  machine slide registration means connected to said machine tool for providing machine slide signals which are changed in response to a movement of said machine slide; and
  means connected to said workpiece registration means and said machine slide registration means for altering said machine slide signals to conform to said dimension signals.

6. Measuring apparatus according to claim 5 additionally comprising:
  means at an operator's position for moving said machine slide;
  a workpiece display connected to said workpiece registration means for displaying a representation of said dimension signals; and
  a machine slide display connected to said machine slide registration means for displaying a representation of said machine slide signals, said displays being visible from the operator's position.

7. Measuring apparatus according to claim 5 further comprising:
  multiplexing means for alternatively providing said dimension and machine slide signals; and
  a motor for moving said machine slide in response to signals provided by said multiplexing means.

* * * * *